(12) United States Patent
Zaniolo et al.

(10) Patent No.: US 7,606,223 B2
(45) Date of Patent: Oct. 20, 2009

(54) HANDLING COMMUNICATIONS BETWEEN STATIONS IN A DIGITAL TELECOMMUNICATIONS SYSTEM

(75) Inventors: Luiz Cesar Zaniolo, Boca Raton, FL (US); Francisco Olympio Marcon da Rocha, Boca Raton, FL (US); Robinson Osmar Lima, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 576 days.

(21) Appl. No.: 11/269,076

(22) Filed: Nov. 8, 2005

(65) Prior Publication Data

US 2007/0104122 A1 May 10, 2007

(51) Int. Cl.
*H04L 12/66* (2006.01)
*H04L 12/28* (2006.01)

(52) U.S. Cl. ...................................... 370/352; 370/401
(58) Field of Classification Search ......... 370/351–356, 370/389, 400, 401
See application file for complete search history.

(56) References Cited

U.S. PATENT DOCUMENTS

| | | | |
|---|---|---|---|
| 2002/0136206 A1* | 9/2002 | Gallant et al. ............... | 370/352 |
| 2004/0103157 A1* | 5/2004 | Requena et al. ............. | 709/206 |
| 2005/0041578 A1* | 2/2005 | Huotari et al. .............. | 370/229 |
| 2005/0135374 A1* | 6/2005 | Isomaki et al. ........... | 370/395.2 |
| 2005/0213606 A1* | 9/2005 | Huang et al. ................ | 370/467 |
| 2005/0237978 A1* | 10/2005 | Segal ......................... | 370/331 |
| 2006/0002355 A1* | 1/2006 | Baek et al. .................. | 370/338 |
| 2006/0039359 A1* | 2/2006 | Pang .......................... | 370/352 |
| 2006/0067287 A1* | 3/2006 | Kim et al. ................... | 370/338 |
| 2006/0072526 A1* | 4/2006 | Rasanen ..................... | 370/338 |
| 2007/0030973 A1* | 2/2007 | Mikan ........................ | 380/270 |
| 2008/0043717 A1* | 2/2008 | Bellora et al. ............... | 370/352 |

* cited by examiner

*Primary Examiner*—Hong Cho

(57) ABSTRACT

A method and program product for handling communications with stations in communications systems, especially digital telecommunications systems, such as for VoIP telephony. Requests are received for communicating with communications stations in the communications system. Each request is forwarded to a respective communications system station, which returns an indication of an intended response. Depending upon whether the intended response is appropriate, the proposed response may be forwarded to the requester. Otherwise, if the intended response is determined inappropriate, an indication is returned to the communications system station that the intended response is inappropriate.

18 Claims, 2 Drawing Sheets

HANDLING COMMUNICATIONS BETWEEN STATIONS IN A DIGITAL TELECOMMUNICATIONS SYSTEM

BACKGROUND OF THE INVENTION

1. Field of the Invention

The present invention is related to communications systems and more particularly, to digital communications systems such as VoIP telecommunications systems.

2. Background Description

Commercial telecommunications platforms have allowed service providers to deliver Internet Protocol (IP) based telecommunications services. Typical such IP telecommunications services feature common channel telecommunications packet switching capabilities, such as Signaling System Number 7 (SS7) signaling capabilities. These capabilities allow for legacy feature support and, further, interconnection with Public Switched Telephone Networks (PSTN). Digital communications such as Voice over IP (VoIP), for example, normally use Session Initiation Protocol (SIP) for establishing and clearing of connections between network stations. VoIP calls using SIP work well for a relatively simple connection with simple user control, e.g., using a typical user interface.

However, some complex features have proven difficult to implement in VoIP using SIP, regardless of the user interface. For example, SIP has no provision for handling calls directed to unavailable locations, or calls forwarded to restricted access locations. Instead, these may be handled by the network communications server, on an ad hoc basis with spotty results. Unfortunately, such calls have a high likelihood of occurrence.

Thus, there is a need for flexibly adding features to Session Initiation Protocol (SIP) based systems and, more particularly, for a simple efficient way to add features, even complex features, to existing Voice over IP (VoIP) systems.

SUMMARY OF THE INVENTION

It is a purpose of the invention to expand the capabilities of existing communications systems;

It is another purpose of the invention to seamlessly add features to existing digital communications systems.

The present invention relates to a method and program product for handling communications with stations in communications systems, especially digital telecommunications systems, such as for VoIP telephony. Requests are received for communicating with communications stations in the communications system. Each request is forwarded to a respective communications system station, which returns an indication of an intended response. Depending upon whether the intended response is appropriate, the proposed response may be forwarded to the requester. Otherwise, if the intended response is determined inappropriate, an indication is returned to the communications system station that the intended response is inappropriate.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
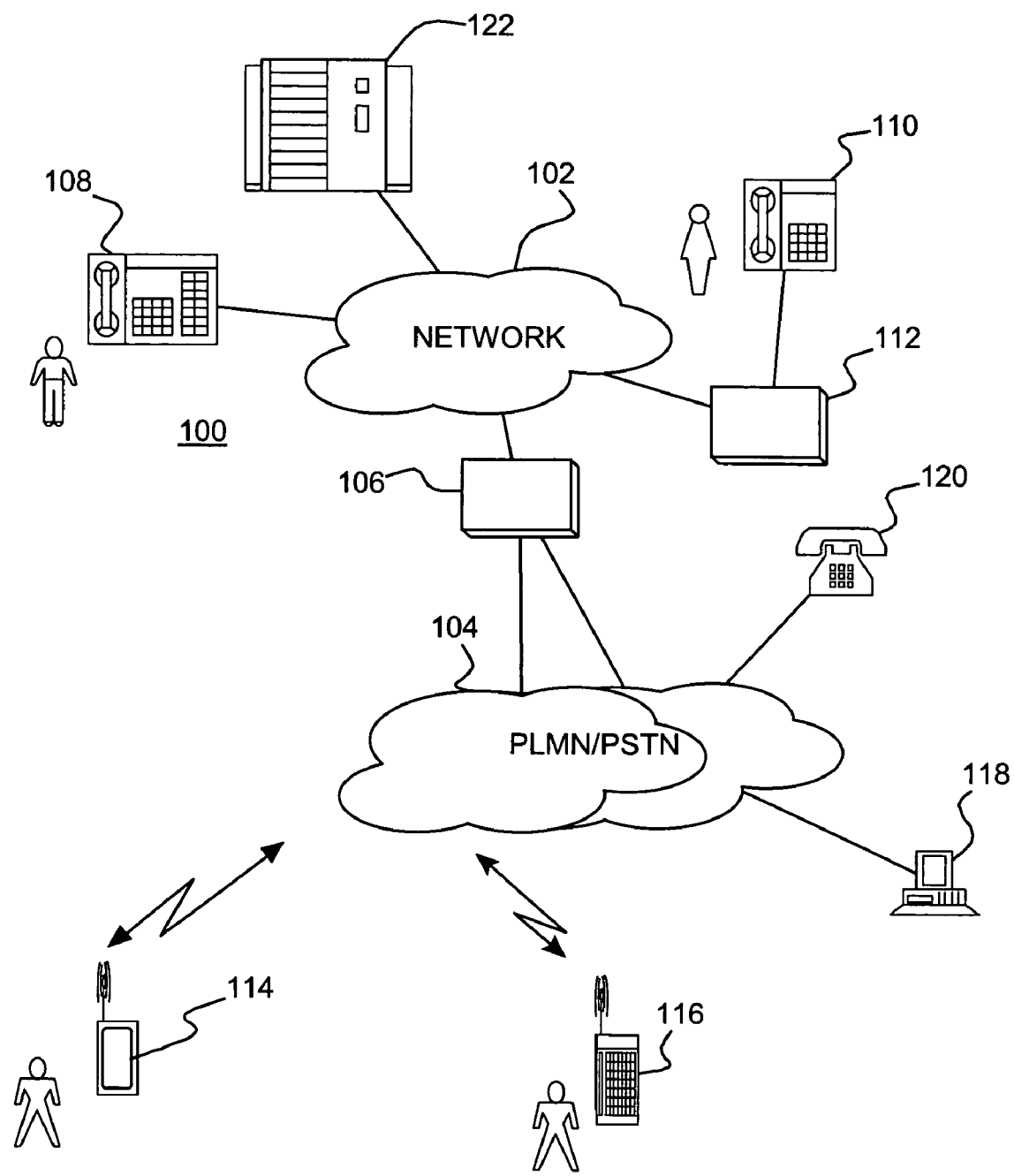
FIG. 1 shows an example of a communications system according to a preferred embodiment of the present invention.

Turning now to the drawings and more particularly, FIG. 1 shows an example of a communications system 100 including a digital call handling capable network 102, according to a preferred embodiment of the present invention. Although shown as a local area network 102 handling Voice over Internet Protocol (VoIP) calls in this example, the network 102 may be any suitable network including, for example, the Internet. Further, in this telecommunications example, the system 100 includes a typical Internet Protocol (IP) Multimedia (IM) Subsystem or IMS bundle for interfacing multimedia information (e.g., voice and data) to a public switched telephone network/public land mobile network, PSTN/PLMN 104, e.g., through a gateway 106. Communications network stations 108, 110 may be devices that are connected directly to the network 102 (i.e., as an endpoint), or through a proxy 112. Also, communications devices on the PSTN/PLMN 104, e.g., a wirelessly connected handheld 114, a cellular phone 116, a modem connected personal computer (PC) 118, and/or an analog/digital telephone 120, connect through gateway 106. One or more application server(s) 122 in the network 102 provide the preferred system 100 with telecommunications services features, e.g., voice features and e-mail. Preferably, the applications server 122 is a Session Initiation Protocol (SIP) applications server. It should be noted that although described herein in terms of calls between the network 102, gateway 106, proxy 112, endpoints 108, 110 and telecommunications devices 114-120, this is for example only and not intended as a limitation.

The SIP application server 122 handles communications links with and between network entities, i.e., network stations 108, 110, and with telecommunications devices 114-120, gateway 102, proxy 112 and the network 102. An equivalent state of the art system is normally equipped to handle most circumstances for which a response has been specifically provided (e.g., built in special features), but is otherwise unequipped to handle something out of the ordinary, new features or features newly added on the fly. However, endpoints 108, 110, gateway 106, and server 122 in a preferred embodiment telecommunications system 100 include a capability to create a special SIP message in response to any unexpected circumstances. The special SIP message or consultation message is referred to herein as a PERMISSION SIP message or simply a PERMISSION. The PERMISSION indicates a potential or intended response to the SIP application server 122 for the particular circumstances.

So, for example, upon commencement of an attempted link between network entities, the SIP application server 122 receives a request from one initiating endpoint or gateway, and originates a request to another, receiving endpoint. The receiving endpoint creates the PERMISSION that includes an intended response, or at least a partial indication of a response to the initiating endpoint, which is returned to the SIP application server 122. The SIP application server 122 determines from the PERMISSION whether the intended response is appropriate/authorized for the corresponding initiating endpoint, e.g., forwarding an incoming call from the initiating endpoint to another station. If the response is authorized, the receiving endpoint generates the desired response message, forwarding the incoming call in this example. Otherwise, the response is unauthorized and, instead of having no predetermined/preselected response available, the PERMISSION may provide the SIP application server 122 with an appropriate alternate response. Thus, by including PERMISSION SIP messages, the system can implement complex features, even in a system where no such provision has been made to accommodate, much less make available those complex features and even without requiring a user interface to implement the features or handle feature requests interactively.

In another general example with reference to FIG. 1, communications begins as a message originating from one initiating endpoint, e.g., from telephone 120 on PLMN/PSTN 104 at gateway 106, is directed to a second, e.g., through application server 122 to a user identified with digital telephone 110 at proxy 112. In this example, the user at digital telephone 110 has the do not disturb feature selected. According to a preferred embodiment of the present invention, endpoint 110 responds with a PERMISSION, which is returned through proxy 112 to the application server 122. The PERMISSION includes an intended response from the endpoint 110. The applications server 122 analyzes the PERMISSION and determines an appropriate action that depends upon the contents of the PERMISSION. So, for this example, if the application server 122 determines that the endpoint 112 is allowed to send the desired message (refuse the call), the application server 122 grants the request by sending a positive acknowledgement back to endpoint 110. The endpoint 110 then generates the response to refuse the call to application server 122. The applications server 122 forwards the response to endpoint 106, which takes an appropriate action, e.g., sends a busy tone. Otherwise, if the applications server 122 determines from the PERMISSION that the response is not authorized, the applications server 122 responds to the endpoint 110 with a "403 Forbidden" SIP message, for example. So, instead of sending the response to refuse the connection, the call continues to ring at the network station.

Figure 2:
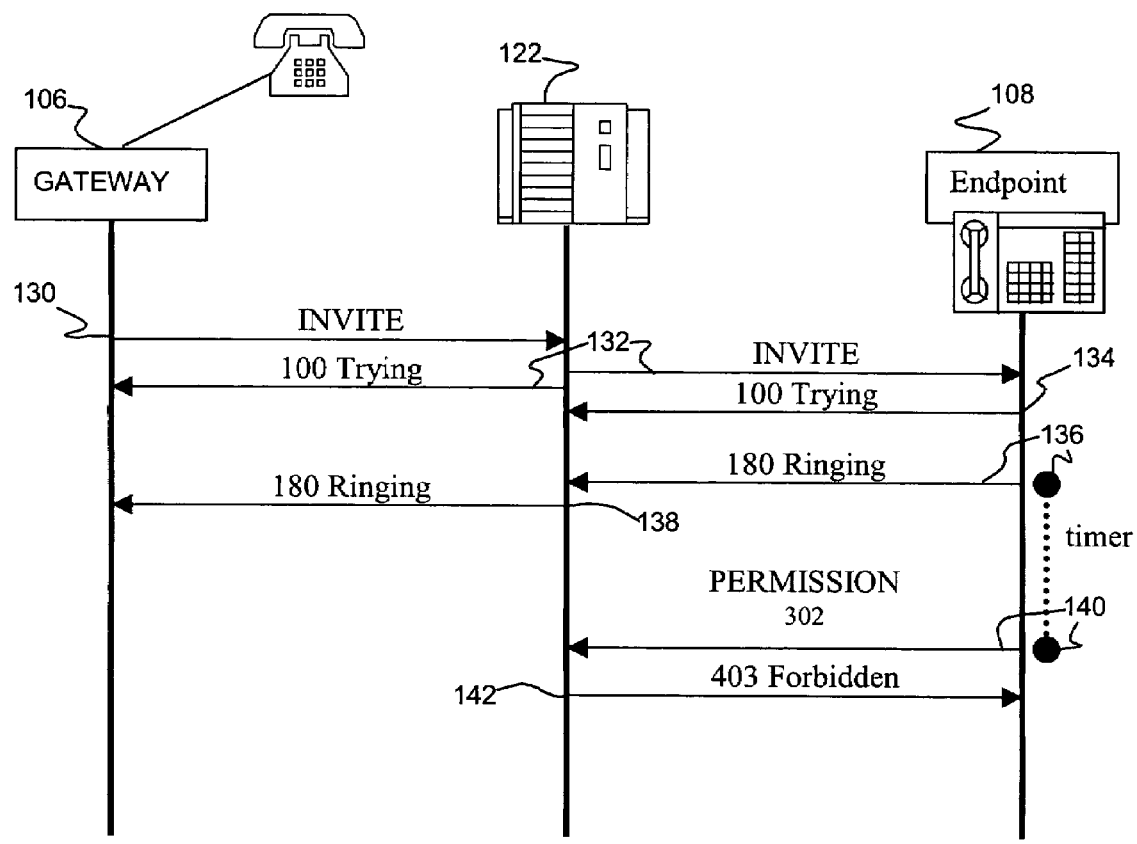
FIG. 2 shows an example of implementation of the present invention in a state of the art VoIP communications network, for communications between endpoints through applications server.

FIG. 2 shows an example of an implementation of the present invention in a state of the art VoIP communications network, for communications between gateway 106 and endpoint 108 through an applications server 122, e.g, as in the network 102 of FIG. 1 with like elements labeled identically. The applications server 122 may be implemented, for example, in a hiQ 8000 VoIP Softswitch/Media Gateway Controller (MGC) from Siemens Corporation. So for this example, an incoming call through gateway 106 initiates a connection to endpoint 108 by sending an INVITE message 130 to applications server 122. At 132, the application server 122 both acknowledges receiving the INVITE with a "100 Trying" message and generates a new INVITE to endpoint 108. The endpoint 108 responds at 134 by returning a "100 Trying" message to the applications server 122. In this example, the user for digital telephone endpoint 108 has "call forwarding on ring no answer" active at the endpoint. At 136 the endpoint 108 follows with a "180 Ringing" response and starts a timer. At 138 the applications server 122 forwards the "180 Ringing" response to the gateway 106. When the timer expires at 140, endpoint 108 sends a "PERMISSION 302" that describes the potential (i.e., if permitted) response. So, the PERMISSION may be for a "302 Moved Temporarily" message which requests that incoming calls be forwarded to a given destination. However, before forwarding the call, the applications server 122 analyzes the PERMISSION and verifies whether the call to endpoint 108 may be forwarded to the designated destination. When the application server 122 receives the PERMISSION message, it determines from a local (to the server) database if the endpoint is allowed to forward the call to the desired destination.

If the applications server 122 determines that the intended response is appropriate, the applications server 122 returns a "200 OK" SIP message (not shown) and the endpoint 108 sends the "302 Moved Temporarily" message to request the call to be handled normally, forwarded in this example. When, however, the verification indicates that the endpoint is not allowed to forward to the desired destination (e.g., international), the applications server 122 declines the PERMISSION at 142 by returning a "603 Decline" or a "403 Forbidden" message to endpoint 108. As a result, the endpoint 108 receives an indication that the message was not allowed to be forwarded. So, instead of forwarding, the call continues to ring at the digital telephone endpoint 108, e.g., until Voice Mail answers.

By contrast, previously upon timer expiration, the destination endpoint returned the "302 Moved Temporarily" message to the applications server. However, a problem occurred whenever the initiating endpoint was not allowed or not intended to connect to the forwarded destination. There was no SIP response message for refusing to forward the connection. Consequently, the applications server had no way of refusing the forward request. The present invention overcomes this shortfall in the prior art.

Advantageously, the present invention provides a simple elegant solution to this problem and expands the capabilities of existing communications systems. Further, the present invention may be applied to any digital communications system, regardless of protocol.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of handling communications with stations in a communications system, said method comprising the steps of:
    a) receiving a request for communications with a communications station;
    b) forwarding said request to said station;
    c) returning an intended response;
    d) determining whether said intended response is inappropriate; and whenever said intended response is determined inappropriate,
    e) returning to said station an indication that said intended response is inappropriate.

2. A method of handling communications with stations in a communications system as in claim 1, wherein whenever said intended response is determined appropriate, said response is returned to a requesting station.

3. A method of handling communications with stations in a communications system as in claim 1, wherein said communications system includes an Internet Protocol (IP) Multimedia (IM) Subsystem.

4. A method of handling communications with stations in a communications system as in claim 2, wherein said request originates at a first endpoint and said response originates at a second endpoint, said requesting station being at first endpoint and said station being at said second endpoint.

5. A method of handling communications with stations in a communications system as in claim 1, wherein said request and said response are passed through an application server.

6. A method of handling communications with stations in a communications system as in claim 5, wherein said application server is a Session Initiation Protocol (SIP) applications server.

7. A method of handling communications with stations in a communications system as in claim 6, wherein said intended response is included in a SIP message.

8. A computer-readable medium having stored thereon a plurality of instructions, the plurality of instructions including instructions that, when executed by a processor, cause the processor to:
   a) receive requests for communications with communications stations;
   b) forward received said requests to endpoints, each intended one of said communications stations being at a corresponding endpoint;
   c) receive responses from said endpoints, each received response including an intended response to a forwarded request; and
   d) indicate to each of said endpoints whether a corresponding said intended response is appropriate, appropriate responses being handled normally, each said corresponding endpoint indicated to be providing an inappropriate said intended response responding with an alternate response.

9. A computer-readable medium as in claim 8, wherein said processor is operating in communications system including an Internet Protocol (IP) Multimedia (IM) Subsystem (IMS).

10. A computer-readable medium as in claim 9, wherein each of said requests originates at a first endpoint in said IMS and said each received response originates at a second said corresponding endpoint in said IMS.

11. A computer-readable medium as in claim 10, wherein said processor is in an applications server in said IMS.

12. A computer-readable medium as in claim 11, wherein said applications server is a Session Initiation Protocol (SIP) applications server.

13. A computer-readable medium as in claim 12, wherein said each received response is included in a SIP message.

14. A method of operating an endpoint in a digital communications network, said method comprising the steps of:
   a) receive requests for communications with a network station at said endpoint;
   b) determining an intended response to said received request;
   c) returning a consultation message indicating said intended response to an applications server;
   d) receiving an indication from said applications server that said intended response is not allowed; and
   e) returning an alternate intended response in a message to said applications server.

15. A method of operating an endpoint as in claim 14, wherein said message is a Session Initiation Protocol (SIP) message.

16. A method of operating an endpoint as in claim 15, wherein said application server is a SIP applications server.

17. A method of operating an endpoint as in claim 15, wherein said consultation message is a SIP PERMISSION message that includes said intended response.

18. A method of operating an endpoint as in claim 14, wherein whenever said applications server indicates that said intended response is allowed in step (d) said intended response is returned, said applications server returning the indicated one of said intended response and said alternate intended response to a requesting station.

* * * * *